United States Patent [19]

Bennitt

[11] Patent Number: 4,495,964
[45] Date of Patent: Jan. 29, 1985

[54] UNIDIRECTIONAL-FLOW FLUID VALVE

[75] Inventor: Robert A. Bennitt, Corning, N.Y.

[73] Assignee: Ingersoll-Rand Company, Woodcliff Lake, N.J.

[21] Appl. No.: 493,994

[22] Filed: May 12, 1983

[51] Int. Cl.³ .............................................. F16K 15/02
[52] U.S. Cl. ............................ 137/512.1; 137/516.15; 137/516.25; 137/543.17; 251/333
[58] Field of Search ........... 137/512.1, 516.11, 516.15, 137/516.25, 543.17; 251/318, 333

[56] References Cited

U.S. PATENT DOCUMENTS

| 797,739 | 8/1905 | Meer | 137/516.15 |
|---|---|---|---|
| 3,536,094 | 10/1970 | Manley, Jr. | 137/512.1 |
| 3,829,253 | 8/1974 | Bunn et al. | 137/512.1 |
| 4,036,251 | 7/1977 | Hartwick et al. | 137/512.1 |
| 4,130,131 | 12/1978 | Kucenty | 137/512.1 |
| 4,184,508 | 1/1980 | Mayer et al. | 137/512.1 |

FOREIGN PATENT DOCUMENTS 244832 10/1969 U.S.S.R. ........................... 137/512.1

Primary Examiner—Alan Cohan
Assistant Examiner—John A. Rivell
Attorney, Agent, or Firm—B. J. Murphy

[57] ABSTRACT

In the embodiment shown, the valve has a seat and a stop plate with valving elements therebetween. The seat has pluralities of openings formed therein, and the stop plate has a central void. The valving elements move, to open or close off communication between the openings and the void, in response to pressured fluid. Each element controls fluid flow through a pair of openings. The valve seat has angularly-formed lands with which the elements, correspondingly angularly formed, nest to close off fluid communication through the valve.

17 Claims, 4 Drawing Figures

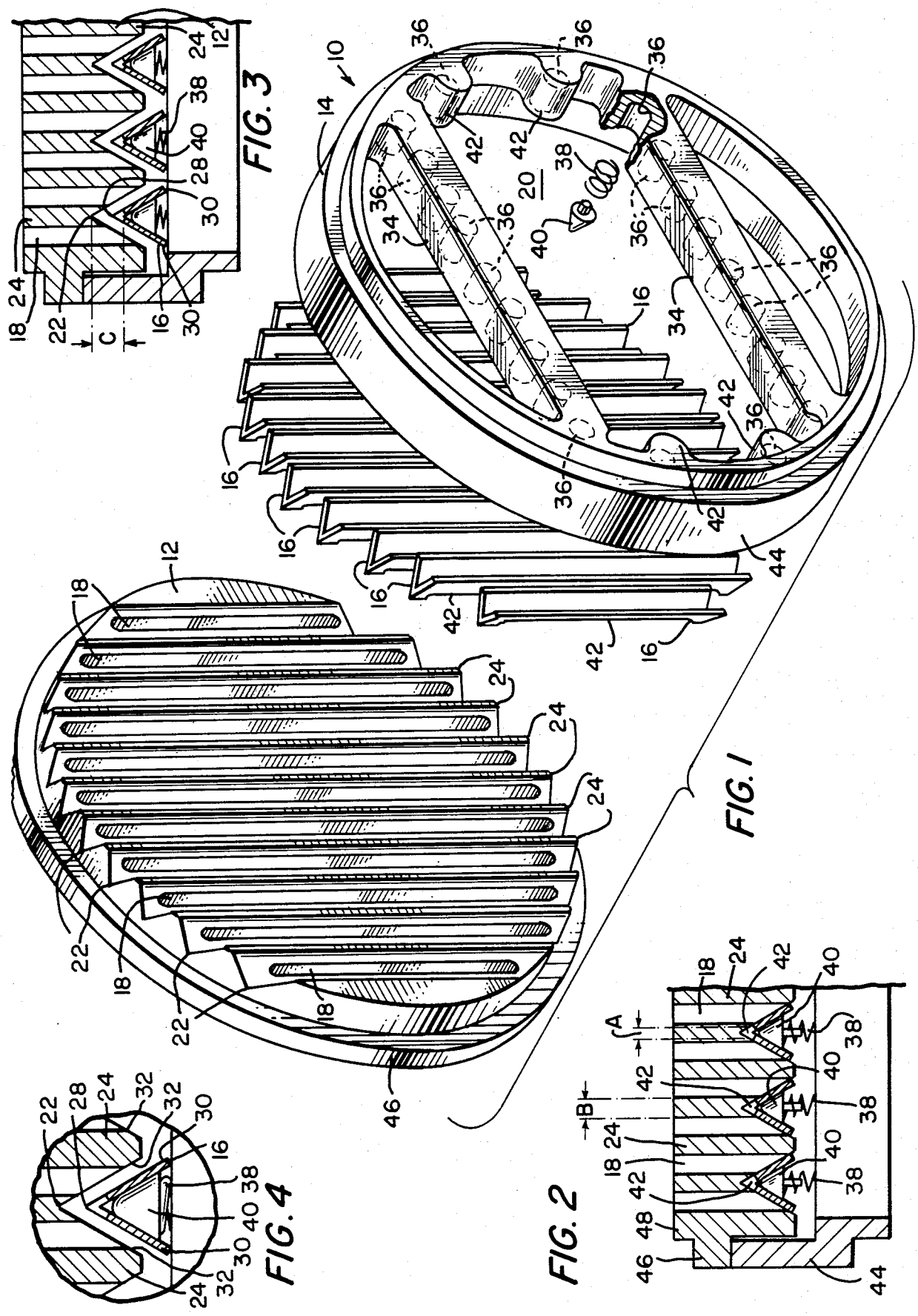

UNIDIRECTIONAL-FLOW FLUID VALVE

This invention pertains to valves, and in particular to unidirectional-flow, fluid valves of the channel-valve type commonly used in gas compressors and the like.

Valves of the aforesaid type to which the invention pertains have channel-shaped valving elements which move through specific guides to remove from and close upon seats, thereby to open and close-off communication through the valve. Each element controls one elongate opening, and each has a flat surface which seats, in closure of its associated opening, in a plane which lies normal to the directed fluid flow through the valve.

It is an object of this invention to disclose an improved valve, of the aforesaid type, which requires no specific guides for the valving elements, and a valve in which each element controls fluid flow through a plurality of openings.

It is particularly an object of this invention to set forth a unidirectional-flow, fluid valve comprising a valve seat; and a stop plate; wherein said seat and plate are in coupled engagement; said seat has pluralities of openings formed therethrough; said plate has a void formed therewithin; and valving means, interposed between said seat and said plate, operative, in response to pressured fluid addressed thereto, for opening and closing communication between said openings and said void; wherein said valving means comprises a plurality of individual valving elements; and each of said valving elements opens and closes such aforesaid communication between a given plurality of said openings and said void.

Further objects of this invention, as well as the novel features thereof, will become more apparent by reference to the following description, taken in conjunction with the accompanying figures, in which:

FIG. 1 is a perspective, exploded view of an embodiment of the novel valve according to the invention;

FIG. 2 is a partial, cross-sectional view through the assembled valve of FIG. 1, showing the valving elements in closure of the valve seat openings;

FIG. 3 is a view like that of FIG. 2, with the valving elements removed from the valve seat openings; and FIG. 4 is an enlarged inset, showing in greater detail, the cooperating structures of the valving elements and valve seat.

As shown in the figures, the valve 10, according to an embodiment thereof, has a valve seat 12 and a stop plate 14 with valving elements 16 therebetween. The valve seat 12 has pluralities of openings 18 formed therein for communication with a void 20 formed centrally in the stop plate 14. The valve seat 12 has a plurality of angular or V-shaped lands 22 formed therein and pairs of ribs 24 astride the lands 22. To each side of the land 22 is one of the elongate openings 18.

The valving elements 16 likewise are V-shaped having apexes 28 and integral, diverging walls 30. The apexes 28 sealingly nest in the lands 22, and the outermost ends of the walls 30 sealingly close upon the ribs 24. Such outermost ends define sealing surfaces which close upon angular, outer edges or seating surfaces 32 of the ribs 24 and the terminal ends of the elements 16 further seal around the terminal ends of the openings 18 by closing onto the thereadjacent ends of the V-shaped lands 22. The seating surfaces 32, of course, define outer terminations of the most adjacent openings 18. Each valving element 16, then, controls fluid flow through a pair of openings 18.

A pair of limbs 34 bridge across the void 20 of the stop plate 14. Each limb 34 has a plurality of spaced apart, cylindrical pockets 36 formed therein in which are set ends of compression springs 38. Each spring 38, within the opposite end thereof, receives a stemmed poppet 40. The latter has a nose which is tapered in conformity with the V-shaped angle of the valving elements. Hence, each element 16 has a pair of the poppets 40, one at each end of the element 16, spring-biased thereagainst to urge the element 16 into closure of its respective pair of openings 18. The shortest-length elements 16 are similarly spring-biased by springs 38 and poppets 40 reacting from pockets 36 formed in bosses 42 extending into the void 20. The springs 38 have, in fact, a two-fold purpose. First, they minimize the impacts of the valving elements 16 against the stop plate 14 by providing a means of deceleration for the elements. Second, where the novel valve 10 is employed in a reciprocating-piston compressor, for instance, the springs 38 begin to return the elements 16 to the valve seat 12 before the end of the piston stroke (when the piston velocity, and Delta P across the valve 10, are zero). This latter purpose and function can prevent backflow through the valve 10 and, accordingly, enhance the volumetric efficiency of such compressor.

Each element 16 has an elongated aperture 42, formed along a a substantial length thereof, of a given width "A" (FIG. 2). The latter is a smaller dimension than the width "B" of the lands 22. Accordingly, when the apexes 28 are nested in the lands 22, the apertures 42 permit no fluid leakage. However, when the elements 16 are removed from the lands 22, the apertures 42, which are of the same length as the associated openings 18, offer a more open, unrestricted flow area thereat for the fluid. The latter area is open, for the extent of the apertures, to the depth "C" (FIG. 3). The apertures 42 terminate near the ends of the elements 16 in order that, as priorly noted, such ends will close upon and seal with the V-shaped lands 22.

In this embodiment, the stop plate 14 has a circumferential, upstanding wall 44, and the valve seat 12 has an outwardly extending, annular flange 46 which sets atop the wall 44. Flange 46 extends from a peripheral wall 48, of the valve seat 12; this wall 48 matingly engages wall 44. Wall 44 defines a guide surface which prevents the valving elements 16 from travelling axially, and the ribs 24, of course, prevent lateral travel of the elements 16.

It has been calculated that, with the valve 10 configured according to this invention, it accommodates a much greater flow-through area, for any given valve size, than the classic, prior art type with flat, channel-type, or plate-type, or ring-type elements. Further, in that the through-flow of fluid is diagonal to the walls 30 of the elements 16, rather than normal thereto, an unexpected and beneficial "washing" effect proceeds therefrom. The valve 10 remains relatively clean for a significantly greater period of time.

While I have described my invention, in connection with a specific embodiment thereof, it is to be clearly understood that this is done only by way of example and not as a limitation to the scope of my invention, as set forth in the objects thereof and in the appended claims.

I claim:

1. A unidirectional-flow, fluid valve, comprising:
   a valve seat; and a stop plate; wherein said seat and plate are in coupled engagement;

said seat has pluralities of openings formed therethrough;

said plate has a void formed therewithin; and valving means, interposed between said seat and said plate, operative, in response to pressured fluid addressed thereto, for opening and closing communication between said openings and said void; wherein said valving means comprises a plurality of individual valving elements;

each of said valving elements opens and closes such aforesaid communication between a given plurality of said openings and said void;

said valve seat has a plurality of lands;

each of said lands is intermediate a pair of said openings;

said elements each have a given surface which closes upon, and removes from, a given one of said lands;

said lands are of angular cross-section;

each of said valving elements is of a substantially right-angular, channel configuration, having an apex and integral walls divergent from said apex;

said apexes of said valving elements sealingly nest in, and remove from, said lands;

each pair of said openings is of a given length;

each valving element has a length which is greater than such given length of the pair of openings upon which it closes, and from which it removes; and each valving element has an elongated aperture, formed in the apex thereof, having a length corresponding to said given length of the pair of openings upon which said element closes, and from which it removes.

2. A valve, according to claim 1, wherein:

said valve seat has a plurality of ribs; and pairs of said ribs are disposed in parallel astride said lands.

3. A valve, according to claim 1, wherein:

said valve seat has a plurality of seating surfaces;

pairs of said seating surfaces are disposed in parallel astride said lands; and each of said elements has sealing surfaces thereon which close upon, and remove from, a given pair of said seating surfaces.

4. A valve, according to claim 3, wherein:

said seating surfaces of each of said pair lie in mutually-traversing planes.

5. A valve, according to claim 3, wherein:

each of said elements has a pair of said sealing surfaces; and said sealing surfaces of each pair thereof lie in mutually-traversing planes.

6. A valve, according to claim 1, wherein:

each of said elongated apertures is of a prescribed width; and each of said lands is of a width greater than said prescribed width.

7. A valve, according to claim 1, wherein:

said openings of each said pair have terminations in a surface of said seat which confronts said plate; and said confronting-surface terminations subsist in mutually traversing planes.

8. A valve, according to claim 1, wherein:

said plate has means bridging across said void; and said valving further comprises means interposed between said bridging means and said valving elements normally biasing said elements in closure of said communication.

9. A unidirectional-flow, fluid valve, comprising:

a valve seat; and a stop plate; wherein said seat and plate are in coupled engagement;

said seat has pluralities of openings formed therethrough;

said plate has a void formed therewithin; and valving means, interposed between said seat and said plate, operative, in response to pressured fluid addressed thereto, for opening and closing communication between said openings and said void; wherein said valving means comprises a plurality of individual valving elements;

said valve seat has a plurality of lands;

each of said lands is intermediate a pair of said openings;

said elements each have a given surface which closes upon, and removes from, a given one of said lands;

said lands are of angular cross-section;

each of said valving elements is of a substantially right-angular, channel configuration, having an apex and integral walls divergent from said apex; and said apexes of said valving elements sealingly nest in, and remove from, said lands;

each pair of said openings is of a given length;

each valving element has a length which is greater than such given length of the pair of openings upon which it closes, and from which it removes; and each valving element has an elongated aperture, formed in the apex thereof, having a length corresponding to said given length of the pair of openings upon which said element closes, and from which it removes.

10. A valve, according to claim 9, wherein:

said valve seat has pluralities of ribs; and pairs of said ribs are disposed in parallel astride said lands.

11. A valve, according to claim 9, wherein:

said valve seat has a plurality of seating surfaces;

pairs of said seating surfaces are disposed in parallel astride said lands; and each of said elements has sealing surfaces thereon which close upon, and remove from, a given pair of said seating surfaces.

12. A valve, according to claim 11, wherein:

said seating surfaces of each of said pair lie in mutually-traversing planes.

13. A valve, according to claim 11, wherein:

each of said elements has a pair of said sealing surfaces; and said sealing surfaces of each pair thereof lie in mutually-traversing planes.

14. A valve, according to claim 9, wherein:

each of said elongated apertures is of a prescribed width; and each of said lands is of a width greater than said prescribed width.

15. A valve, according to claim 13, wherein:

said openings of each said pair have terminations in a surface of said seat which confronts said plate; and said confronting-surface terminations subsist in mutually-traversing planes.

16. A valve, according to claim 13, wherein:

said plate has means bridging across said void; and said valving further comprises means interposed between said bridging means and said valving elements normally biasing said elements in closure of said communication.

17. A valve, according to claim 13; wherein:
each of said valving elements opens and closes such aforesaid communication between a given plurality of said openings and said void.

* * * * *